July 20, 1965   R. A. STEINKAMP   3,195,814
METER DEVICE

Filed April 30, 1963   3 Sheets-Sheet 1

INVENTOR
Robert A. Steinkamp
BY
Spencer, Rockwell & Bartholow
ATTORNEYS

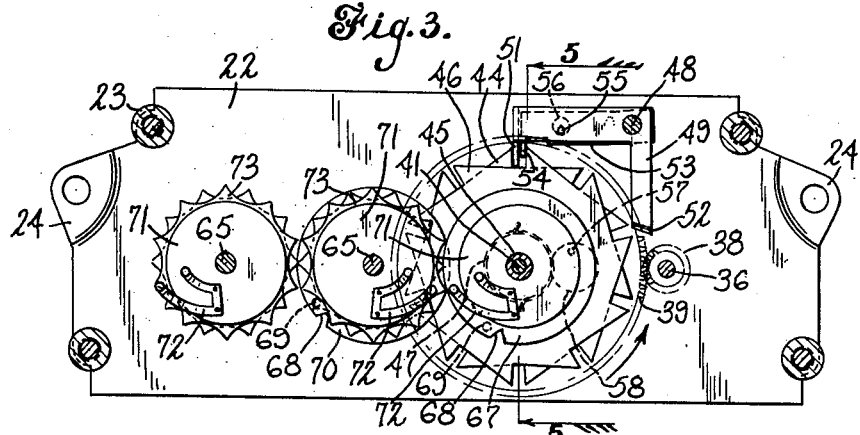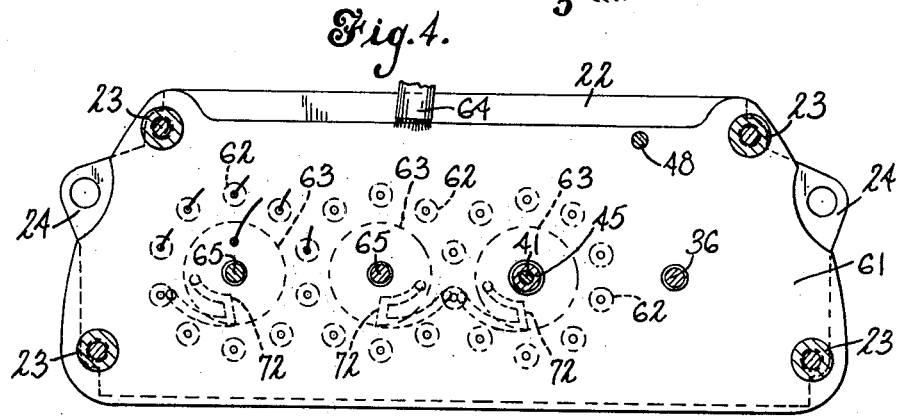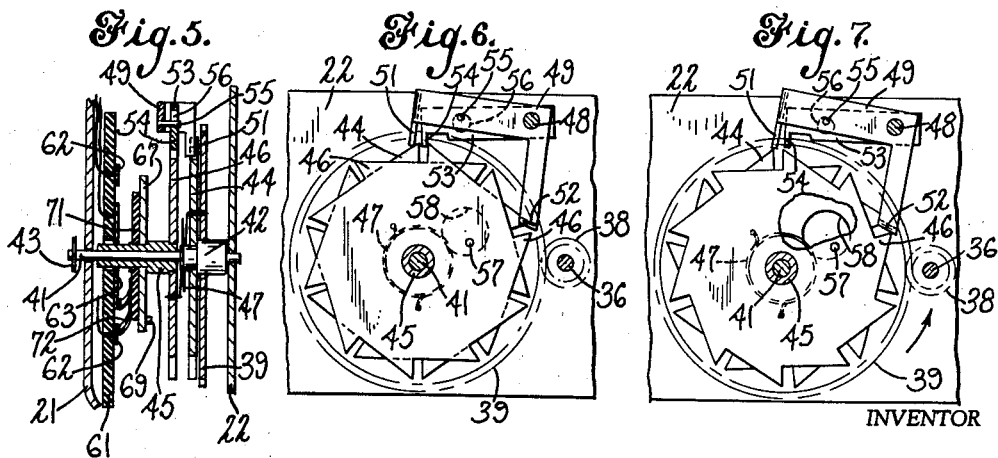

July 20, 1965
R. A. STEINKAMP
3,195,814
METER DEVICE
Filed April 30, 1963
3 Sheets-Sheet 3
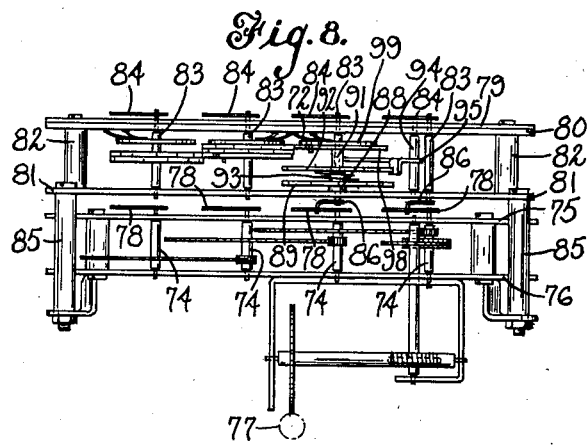
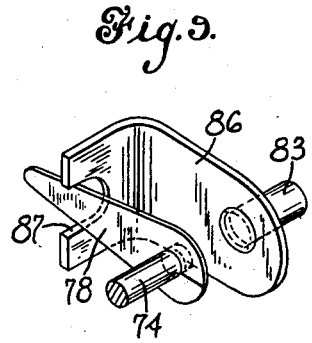
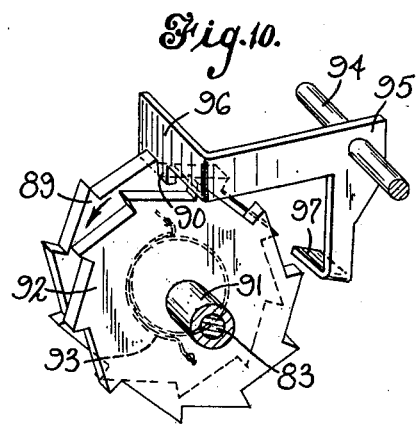
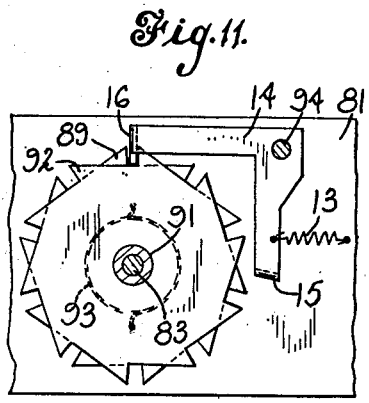
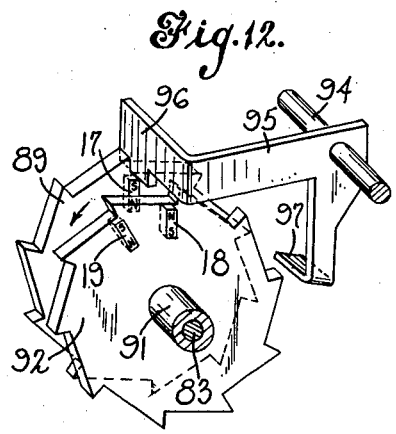
INVENTOR
Robert A. Steinkamp
BY Spencer, Rockwell & Bartholow
ATTORNEYS

United States Patent Office 3,195,814
Patented July 20, 1965

3,195,814
METER DEVICE
Robert A. Steinkamp, Middletown, Conn., assignor to Ripley Company, Inc., Middletown, Conn.
Filed Apr. 30, 1963, Ser. No. 276,839
15 Claims. (Cl. 235—113)

This invention relates generally to a meter device and more particularly to a device or register for use with electric read-out equipment for meters such as the usual type of commercial or residential watt-hour meters, gas meters, water meters, and the like. Specifically, the invention relates to the novel construction of a meter device and the construction of a device adapted to be used in conjunction with existing meters.

The device and construction hereinafter disclosed may be used in connection with automatic electric read-out systems such as the type disclosed in U.S. Patent 3,006,-712, issued October 31, 1961. As shown in the aforementioned patent, it is known to construct a meter register in such a fashion that it may be wired to a connector adapted to mate with an external connector forming a part of a recording device. By cooperation between the recording device and the meter register the reading of the meter may be automatically accomplished. Visual reading is required on the majority of meters in use today. The recording device may punch a card in response to the values read and the card may be used in an electronic data processing system to automatically calculate and prepare the customer's bill. Of course, it will be evident that other recording media may also be used. In addition, meters can be wired for reading at the meter or for reading at a remote location such as a central recording station.

A typical meter register construction is shown in the lower half of FIG. 4 of aforementioned Patent 3,006,-712. The ones digit is driven from the meter armature and by cooperation of a series of spur gears normally having a one to ten ratio, the tens, hundreds and thousands digits are recorded. Since all the digit recording elements are positively interconnected with the armature drive, the pointer related with each dial will evenly traverse between integers on that dial. Where the meter reading is being recorded electrically rather than visually, this is undesirable since integers only are to be recorded.

Accordingly, it is a primary object of this invention to provide means in a meter for causing the meter to indicate full integers at all times.

Another object of the invention is to provide an improved meter construction wherein positive integer readings may be electrically recorded on all significant figures.

A further object of the invention is to provide means for converting existing meters to meters capable of being automatically read at any instant, the readings always being of full integers.

Still other objects and advantages of the invention will in part be obvious and will in part be apparent from the specification.

Generally speaking, in accordance with the invention, drive means are provided which may be incorporated within the meter or constructed as an attachment to existing meters, the drive means being so constructed that the recording portion of the meter will move substantially instantaneously between full integers only on all significant digits.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which:

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 3;

FIG. 6 is a partial view of the indexing mechanism of FIG. 3 showing the mechanism during operation thereof;

FIG. 7 is a view similar to FIG. 6 showing the mechanism in a more advanced state of operation;

FIG. 8 is a bottom plan view of a meter having an attachment thereon constructed in accordance with the invention;

FIG. 9 is a perspective view of the drive means utilized in FIG. 8;

FIG. 10 is a perspective view of an alternate construction of the indexing mechanism;

FIG. 11 is an elevational view of another construction of the indexing mechanism; and FIG. 12 is a perspective view of still another construction of the indexing mechanism.

Figure 1:
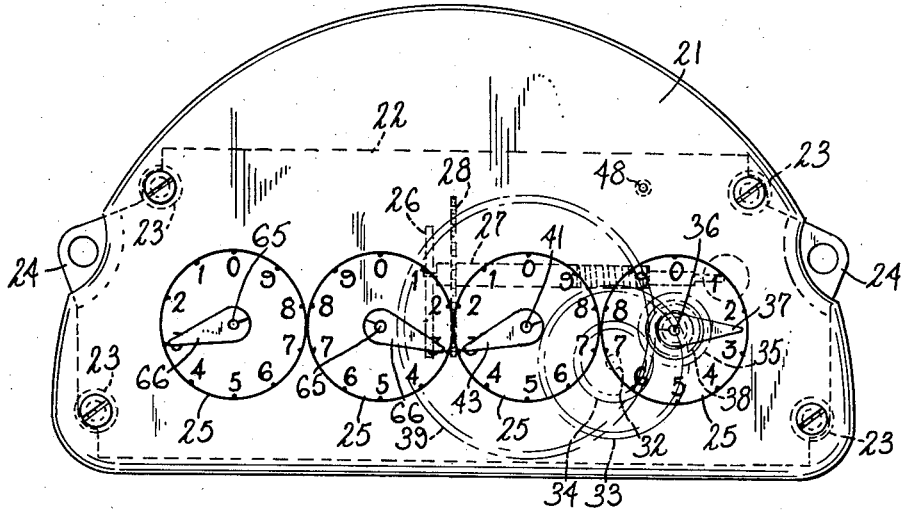
FIG. 1 is a front elevational view of a meter constructed in accordance with the invention.
Figure 2:
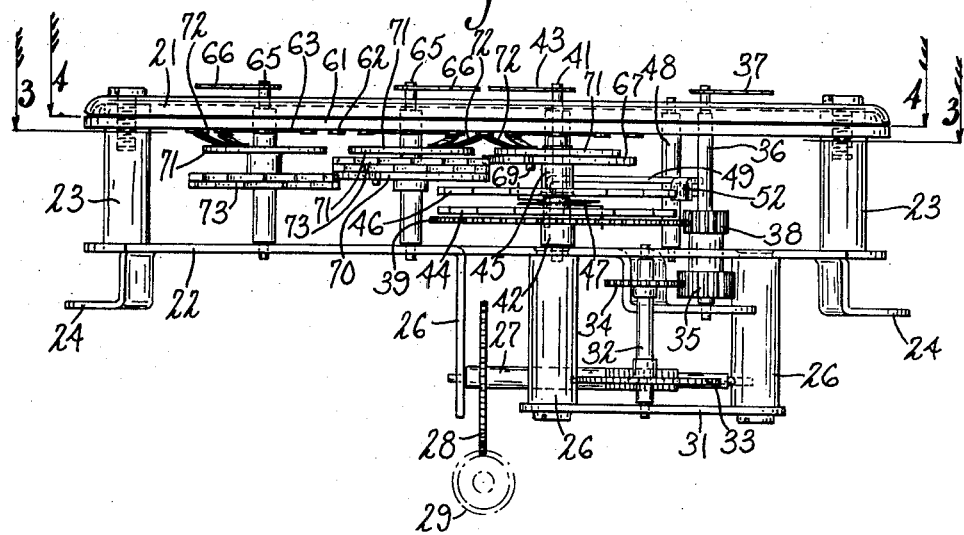
FIG. 2 is a bottom plan view thereof.

By way of example of one type of meter with which the invention may be used, a watt-hour meter register device constructed in accordance with the invention is shown in FIGS. 1 through 7. Referring first to FIGS. 1 and 2, the framework of the meter consists of a front plate 21 spaced from a rear plate 22 by means of spacers 23. Rear plate 22 may carry mounting lugs 24 for attachment to the base (not shown) of the meter. Front plate 21 is provided with a plurality of dials 25 which may be marked to permit visual reading of the meter. Usually, four dials are provided in a meter for residential use which can read up to 9,999 kwh. However, the number of dials may be varied in accordance with the requirements of the meter. Supports 26 are carried by rear plate 22 and a worm gear 27 is journalled for rotation between the supports. Worm gear 27 carries a pinion 28 which engages a worm gear 29 shown in phantom. Worm gear 29 is driven by the armature of the meter (not shown) at a rate proportional to energy flow to thereby measure the amount of consumed electricity. Supports 26 also carry a plate 31 in spaced relation with rear plate 22 and a shaft 32 is journalled for rotation between rear plate 22 and plate 31. Shaft 32 carries a pinion 33 which cooperates with worm gear 27 to drive shaft 32 in response to the rotation of the meter armature.

Shaft 32 also carries a spur gear 34 which meshes with a gear 35 mounted on a shaft 36 extending through and journalled in front plate 21 and rear plate 22. The forward end of shaft 36 carries a pointer 37 which visually indicates the meter reading of the ones digit. As will be seen hereafter, for purposes of recording the meter reading, it is assumed that the ones digit is not significant for billing purposes and, therefore, means for recording the ones digit have been omitted. If, for any reason, it is desired to record the ones digit, this can be accomplished by having the indexing mechanism to be hereafter described cooperate with the ones digit rather than the tens digit. Thus, far, the mechanism described is constructed in a well-known manner.

Referring more especially to FIGS. 2, 3 and 5, a spur gear 38 is mounted fast on shaft 36 and engages a larger diameter spur gear 39. Since the meter is constructed on a system of tens, it will be readily understood that the ratio of diameters of gears 38 and 39 is 1 to 10. A shaft 41 journalled in and extending through front plate 21 and rear plate 22 carries a hub 42 to which gear 39 is mounted. Shaft 41 also carries a pointer 43 adjacent the front face within dial 25 for visually indicating the tens digit. Also mounted fast on hub 42 for rotation with gear 39 and shaft 41 is a ten-lobed ratchet wheel 44. A hub 45 is mounted for free rotation on shaft 41 and hub 45 carries a ten-lobed ratchet wheel 46. Thus, the two ratchet wheels may freely rotate with respect to one another. As shown in FIG. 3, the lobes of ratchet wheel 44 slope in a direction opposite to the slope of the lobes of ratchet wheel 46. A spring wire 47 encircles hub 42 with one end of spring wire 47 being secured in ratchet wheel 44 while the other end is secured in ratchet wheel 46.

Referring now in greater detail to FIGS. 3 and 5 through 7, a shaft 48 is mounted between front plate 21 and rear plate 22. A bell crank lever 49 is pivotally mounted intermediate its ends on shaft 48. One end of bell crank lever 49 carries a depending arm 51 adapted to engage and ride on the peripheral edge of ratchet wheel 44. The other end of lever 49 carries a stop arm 52 adjacent the peripheral edge of ratchet wheel 46. A lever 53 is also pivoted at one end on shaft 48 and the other end carries a detent 54 adjacent the periphery of ratchet wheel 46. Bell crank lever 49 cooperatively engages lever 53 by means of a pin 55 secured in lever 49 and extending through an aperture 56 in lever 53.

An insulating board 61 is also supported adjacent front plate 21 between the front plate and the rear plate, by means of spacers 23. For each dial 25 of the significant figures a plurality of circumferentially-spaced contacts 62 are provided on the insulating board. Also, an annular contact ring 63 is provided on the board within contacts 62. The contacts and contact rings are concentric with the dials. Each of the contacts and the annular contact ring adjacent each dial are wired as shown in FIG. 4 and the wires may be taken off by means of a cable 64. Since the circuitry of the wiring forms no part of this invention, further description thereof is deemed unnecessary. However, it may be noted that a circuit such as is shown in aforementioned U.S. Patent 3,006,712 may be used. In the meter herein described, three sets of contacts and contact rings are shown, with shaft 41 passing through the center of the ring of the least significant figure, the tens digit, for example. A shaft 65 also passes through each of the other contact rings, the shafts being journalled between the front plate and rear plate with a pointer 66 mounted on a shaft adjacent each dial.

Referring again to FIGS. 3 and 5, hub 45 carries a disc 67 having a single tooth 68 and a projecting pin 69. Also mounted on hub 45 adjacent disc 67 is an insulator 71 carrying a contact wiper 72 provided with arms which concurrently engage annular contact ring 63 and one of contacts 62. Disc 67 and insulator 71 rotate with hub 45. As best seen in FIGS. 2 and 3, the shaft 65 carrying the pointer for the hundreds digit, which is adjacent shaft 41, carries a pair of ten-lobed wheels 73 with the lobes being defined by concave cut-outs. The wheels are positioned so that the lobe of one wheel falls between two lobes of the other wheel. As shown, disc 67 is adjacent one of the wheels 73 and engagement of the periphery of disc 67 with the concave portion of the wheel, prevents rotation of the wheel. However, when the single tooth 68 aligns with a lobe, wheel 73 will be free to rotate and positive drive will be by means of engagement of pin 69 with one of the lobes on the other wheel of the pair. Thus, wheels 73 will be indexed once upon each rotation of disc 67 and, as shown, ten revolutions of disc 67 will effect one revolution of wheels 73. This mechanism for converting rotary motion to intermittent rotary motion is sometimes known as a Geneva mechanism. The shaft within the dial for the thousands digit also carries a pair of wheels 73 which cooperate with a disc 70 on the previous shaft. As before, the disc is provided with a tooth and a pin to provide the locking intermittent transmittal of motion. Each of shafts 65 also carries an insulator 71 and a contact wiper 72 for making contact between the associated annular contact ring and one of the circumferentially-spaced contacts.

The operation of the meter may be described as follows. The meter armature drives gear 29 which, through the series of gears and worms, drives shaft 36 and through gear 38 drives gear 39. Gear 39 rotates in the direction indicated by the arrow in FIG. 3 and the escapement mechanism is normally in the position shown in that figure. Arm 51 on lever 49 rests, by means of gravity, at the base of a lobe on ratchet wheel 44 while detent 54 engages one of the teeth on ratchet wheel 46. Ratchet wheel 44 rotates with gear 39, but rotation of ratchet wheel 46 is prevented by means of the detent. As arm 51 rides higher on the lobe of rotating ratchet wheel 44, as shown in FIG. 6, stop arm 52 is rotated into a position blocking one of the lobes of ratchet wheel 46. As lever 49 continues to be raised or rotated, pin 55 engages the wall of aperture 56 and raises lever 53 to move detent 54 out of engagement with ratchet wheel 46. This position is shown in FIG. 7. During the rotation of ratchet wheel 44, spring 47 is being wound so that a force is exerted on ratchet wheel 46 to urge it in the same direction as the direction of rotation of ratchet wheel 44. Even with detent 54 out of engagement with the ratchet wheel, rotation of ratchet wheel 46 is still prevented by stop arm 52, as best shown in FIG. 7, when arm 51 clears the lobe of ratchet wheel 44 and drops again to the position shown in FIG. 3, stop arm 52 moves out of engagement with ratchet wheel 46 and allows it to make an instantaneous rotation under the spring force, until the next lobe on ratchet wheel 46 engages detent 54 which has also dropped back to the FIG. 3 position. Thus, continuous rotation of gear 39 effects an intermittent rotation between positive positions of ratchet wheel 46 and the hub on which it is mounted. Since each ratchet wheel is provided with ten lobes, ratchet wheel 46 will move through ten positions during a single rotation, corresponding to integers 1 through 0 of the tens digit. Since disc 67 and insulator 71 are also carried on the same hub, intermittent rotation will also be imparted to these elements. It will be seen that the intermittent, substantially instantaneous rotation of hub 45 assures that contact arm 72 will never attain the position between contacts 62 but will always positively engage one of the contacts to give a positive, finite reading.

As shown in FIG. 5, pointer 43 is mounted on shaft 41 so that the pointer may move continuously. If it is desired to have the pointer at full integers at all times, the pointer could be mounted on the hub rather than on the shaft. Upon every revolution of disc 67, one increment of motion will be transmitted to adjacent wheels 73, thereby also assuring positive contact between contact arm 72 and the associated contacts. The Geneva type mechanism also assures positive contact will be made and that full integers will be electrically read from the last dial. It should be noted that, in the event of failure of spring 47, a positive drive is provided by means of a pin 57 mounted in ratchet wheel 46 extending through an aperture 58 in ratchet wheel 44.

The construction described in connection with FIGS.

1 through 7 relates to a meter constructed in accordance with the invention. However, the invention also contemplates the utilization of a novel construction in a unit adapted to modify an existing meter to provide electrical read-out of finite integers at each significant figure. Referring to FIGS. 8 and 9, an existing meter would have a front plate 75 and a rear plate 76 with a plurality of shafts mounted therebetween carrying gears cooperating with one another to visually record the rotation of worm 77 driven by the meter armature. Each of the shafts is provided with a pointer 78 which visually indicates the recorded kilowatt hours on dials carried by the front face. The unit incorporating the invention also comprises a front plate 79, an insulating board 80, and a rear plate 81 secured together by means of spacers 82. As shown, four shafts 83 are journalled between the front plate 79 and the rear plate 81 through insulating board 80. The ends of shafts 83 extending through the front plate are provided with pointers 84. These pointers may visually indicate the meter reading on dials (not shown) on the front plate. The unit is mounted to the existing meter and overlies the front plate 75 thereof. Mounting may be by means of spacers 85 so that the outside of rear plate 81 overlies the front of front plate 79 and shafts 83 are in axial alignment with shafts 74. The pointers 78 on the existing meter are utilized to drive the shafts of the attached unit. The means to effect this are clearly shown in FIG. 9. Shaft 83 carries an angular arm 86 having a cutout 87 which receives the pointer 78 mounted on shaft 74 of the existing meter. The cooperation between the pointer and the cutout in the angular arm drives shaft 83 from shaft 74.

The shaft 83 which indicates the ones digit is not constructed to be significant for purposes of electrical read-out and, therefore, the shaft extends freely through rear plate 81 and carries an angular arm 86 cooperating with the pointer 78 of the ones digit of the existing meter. In this manner, the ones digit may be visually read on the dial of the attachment but is not provided with intermittent motion to assure full integer reading. The shaft 83 for the tens digit, the first significant digit, also extends through rear plate 81 and carries an angular arm 86 driven by the associated pointer 78. The intermittent motion device may be as shown in FIG. 3, or an alternate construction may be utilized as shown in FIG. 10. A hub 88 is fast on the shaft 83 and carries a driven ratchet wheel 89. A second hub 91 is rotatably mounted on shaft 83 and carries a ratchet wheel 92. As in the construction heretofore described, the ratchets are oppositely disposed and interconnected by means of a spring 93. A shaft 94 is mounted between the front plate and the rear plate and pivoted thereon is a bell crank 95 having an arm 96 on one end which extends parallel to the axis of shaft 83. Arm 96 is adapted to engage the lobes of ratchet wheel 92 while a depending portion 90 thereof is adapted to ride on the peripheral edge of driven ratchet wheel 89. The other end of bell crank 95 carries a stop arm 97 adapted to engage the lobes of ratchet wheel 92. The operation of the mechanism is similar to that previously described. The existing meter is driven by means of the armature worm, thereby causing continuous rotation of pointer 78. The pointer of the tens digit engages and rotates the associated shaft 83 through angular arm 86, thereby rotating driven ratchet wheel 89 in the direction shown by the arrow in FIG. 10. Ratchet wheel 92, which is freely mounted on shaft 83, does not rotate because of the engagement of arm 96 with a lobe of ratchet wheel 92. As the depending portion 90 rides up on the lobes of driven ratchet wheel 89, bell crank 95 will be rotated in a clockwise direction bringing stop arm 97 into blocking engagement with one of the lobes of ratchet wheel 92. As arm 96 approaches its maximum distance from the center of driven ratchet wheel 89, the arm releases ratchet wheel 92 which is then held by stop arm 97. When arm 96 drops off of the sharp lobe of ratchet wheel 89, stop arm 97 will be moved in a counterclockwise direction and will release ratchet wheel 92. Ratchet wheel 92 will substantially instantaneously rotate one increment under the force of spring 93 until the next lobe on the ratchet wheel engages arm 96 which has returned to the lower position. Thus, for continued movement of driven ratchet wheel 89, ratchet wheel 92 will intermittently move the amount equivalent to a full integer. While the form of escapement mechanism shown in FIG. 10 was described in connection with the device for attachment to an existing meter, it will be readily understood that this form of escapement could be substituted for that shown in FIG. 3, as well as the one shown in FIG. 3 being substituted for that shown in FIG. 8.

Referring again to FIG. 8, hub 91 carries a Geneva type pin and tooth plate 98, and an insulating board 99 carrying a contact wiper 72. The contact wiper is adapted to engage circumferentially spaced contacts and an annular contact ring similar to those shown in FIG. 4. The remaining shafts 83 also carry Geneva type pin and tooth plates to be driven intermittently by the pin and tooth plate 98 on hub 91. These shafts also each carry an insulating board and a contact wiper adapted to engage suitable contacts and contact rings.

In both the escapement mechanisms shown in FIGS. 3 and 10, the mechanism was constructed so that the weight of the bell crank 49 or 95 would tend to rotate it in the counterclockwise direction, thus assuring contact with the surface of the ratchet wheels. However, if the meter is to operate in another plane or if more positive contact is desired, a spring 13, as shown in FIG. 11, may be attached between bell crank lever 14 and one of the plates of the device. The escapement mechanism of FIG. 11 also differs from that shown in FIG. 10, in respect that for each increment of movement of ratchet wheel 89, ratchet wheel 92 will move two half increments. In this construction, stop arm 15 moves clockwise midway between the lobes of ratchet wheel 92 during the raising of the bell crank by rotation of ratchet wheel 89. When the bell crank lifts sufficiently high for arm 16 to free lobe of ratchet wheel 92, stop arm 15 will be in a spaced locking position with reference to the next lobe of ratchet wheel 92. Thus, under the force of spring 93, ratchet wheel 92 will move one-half increment until the lobe engages stop arm 15. Thereafter, when arm 16 completely clears a lobe of ratchet wheel 89 and drops back, stop arm 15 will be moved out of blocking position and allow ratchet wheel 92 to be moved under the force of spring 93 the remaining portion of the increment until the next lobe on ratchet wheel 92 engages arm 16. This mechanism may be utilized where it is desired to have two increments of displacement for each lobe on the ratchet wheel, such as twenty increments from a ten-lobed wheel or ten increments from a five-lobed wheel.

Alternate means for exerting rotational force between the ratchet wheels is shown in FIG. 12. In this construction, a magnet 17 is mounted on ratchet wheel 89 while magnets 18 and 19 are mounted on ratchet wheel 92. All magnets are radially mounted and it is noted that polarity of magnets 18 and 19 are oppositely disposed. This is also true of the relationship between the magnets 17 and 18. During initial rotation of ratchet wheel 89, bell crank 95 through arm 96 prevents rotation of ratchet wheel 92. As magnet 17 approaches magnet 19 the similarity of the poles effects an increase in the repelling force. The magnet 17 approaches but does not attain a position of alignment with magnet 19 by the time arm 96 drops off the lobe on ratchet wheel 89. At this moment, ratchet wheel 92 is released by stop arm 97 and the repelling force between magnets 17 and 19 urge ratchet wheel 92 in a counterclockwise direction. As ratchet wheel 92 rotates, the repelling force between magnets 17 and 19 decreases. However, at the same time, the attracting force between magnets 17 and 18 increases and pulls the two ratchet wheels into alignment in the rest position shown in FIG. 12. It will, of course, be understood that the means shown in FIG. 12 and any other means, in exerting a force between the two ratchet wheels so that they will rotate in the same direction, can be used interchangeably for the springs shown in FIGS. 3 and 10.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Means for converting continuous rotation to intermittent incremental rotation for electrically reading incremental positions comprising a shaft, drive means for driving said shaft, a hub mounted for free rotation on said shaft, a pluri-lobed ratchet wheel on said shaft, a pluri-lobed ratchet wheel on said hub, the direction of slope of the camming portion of one ratchet wheel being reversed from that of the other ratchet wheel, means acting between said first and second ratchet wheels to urge said second ratchet wheel in the same direction of rotation as said first ratchet wheel on the continuously moving shaft, and means engaging both ratchet wheels for preventing movement of said second ratchet wheel until said first ratchet wheel has travelled a preselected angular amount and for thereafter releasing said second ratchet wheel to permit approximately the same angular travel of said second ratchet wheel.

2. The structure defined in claim 1, wherein said means for urging one ratchet wheel with respect to the other ratchet wheel comprises a spring freely encircling said hub having one end attached to one of said ratchet wheels and the other end attached to the other of said ratchet wheels.

3. The structure defined in claim 1 wherein the means acting between said first and second ratchet wheels comprises a radially oriented magnet on said first ratchet wheel and two radially oriented magnets on said second ratchet wheel, said magnets being so constructed and arranged that advancement of said first ratchet wheel while said second ratchet wheel is secured against rotation develops a magnetic restoring force urging said second ratchet wheel to a normal position when said second ratchet wheel is released.

4. A device for providing electrical read-out corresponding to arcuate positions of a circle comprising a shaft, means for rotating said shaft, a first pluri-lobed ratchet wheel mounted on said shaft, a hub mounted on said shaft, a second pluri-lobed ratchet wheel mounted on said hub, means acting between said first and second ratchet wheels to urge said second ratchet wheel in the same rotational direction as said first ratchet wheel, each of said ratchet wheels having the same number of lobes, a detent for alternately arresting and releasing said second ratchet wheel responsive to the rotational position of said first ratchet wheel, a contact wiper carried by said hub, and a plurality of contacts circumferentially spaced concentric with said shaft and adapted to be contacted by said contact wiper.

5. The structure defined in claim 4 wherein said means acting between said ratchet wheels comprises a spring tension wire freely encircling said hub and having one end thereof secured in said first ratchet wheel and the other end thereof in said second ratchet wheel, said spring tension wire so constructed and arranged that rotation of said first ratchet wheel relative to said second ratchet wheel deflects said spring tension wire to apply a rotational force to said second ratchet wheel urging it in the same rotational direction as said first ratchet wheel.

6. The structure defined in claim 4 and further including positive drive means acting between said first and second ratchet wheels.

7. The structure defined in claim 6 wherein said positive drive means comprises a pin secured in one of said ratchet wheels and extending laterally therefrom displaced from the center of rotation thereof and an aperture of substantially larger diameter than the diameter of said pin in the other of said ratchet wheels, said pin extending through said aperture.

8. The structure defined in claim 4 wherein said detent comprises a bell crank lever pivoted on a rod extending parallel to said shaft, said bell crank lever having a first end engaging the peripheral edge of said first ratchet wheel and a second end adapted to engage the peripheral edge of said second ratchet wheel, an arm pivoted at one end thereof to said rod, the other end thereof adapted to engage the peripheral surface of said second ratchet wheel, and positive drive means acting between said bell crank lever and said arm.

9. The structure defined in claim 8 wherein said positive drive means comprises a pin secured in and extending laterally from said bell crank lever and an aperture of substantially larger diameter than the diameter of said pin in said arm, said pin extending through said aperture.

10. The structure defined in claim 4 wherein said detent comprises a bell crank lever pivoted intermediate its ends to a rod parallel to said shaft, said bell crank lever having a first end portion extending at right angles thereto, said first end portion having a first depending section engaging the surface of said first ratchet wheel and a second depending section adapted to engage the peripheral surface of said second ratchet wheel, and said bell crank lever having a second end portion thereof adapted to engage the peripheral edge of said second ratchet wheel.

11. The structure defined in claim 8 and further including resilient means acting on said bell crank lever to urge said first end into contact with the peripheral surface of said first ratchet wheel.

12. The structure defined in claim 10 and further including resilient means acting on said bell crank lever to urge said first depending section into contact with the peripheral surface of said first ratchet wheel.

13. The structure defined in claim 4 wherein the number of circumferentially spaced contacts is equal to the number of lobes on said ratchet wheel.

14. In combination, a shaft, means for rotating said shaft, a first pluri-lobed ratchet wheel mounted on said shaft, a hub mounted on said shaft, a second pluri-lobed ratchet wheel mounted on said hub, each of said ratchet wheels having the same number of lobes, means acting between said first and second ratchet wheels to urge said second ratchet wheel in the same rotational direction as said first ratchet wheel, a detent for alternatively arresting and releasing said second ratchet wheel responsive to the rotational position of said first ratchet wheel, said detent comprising a bell crank lever pivoted intermediate its ends to a rod parallel to said shaft, said bell crank lever having a first end portion engaging the peripheral surface of said second ratchet wheel, and means adapted to engage the second ratchet wheel for releasably preventing rotation of said second ratchet wheel responsive to the position of said first end portion relative to the peripheral surface of said first ratchet wheel.

15. The structure defined in claim 14, wherein said second end portion is adapted to be positioned midway between lobes of said second ratchet wheel upon release of the means preventing rotation thereof, to thereby provide intermittent incremental motion of said second ratchet wheel during continuous rotation of said first ratchet wheel, the number of increments being equal to twice the number of lobes on said ratchet wheels.

References Cited by the Examiner
UNITED STATES PATENTS

| | | | |
|---|---|---|---|
| 882,076 | 3/08 | Nelson | 235—91 |
| 1,727,966 | 9/29 | Dement | 346—14 |
| 2,416,081 | 2/47 | Bakke | 235—91 |
| 2,632,421 | 3/53 | Perkins | 74—69 X |
| 2,957,743 | 10/60 | Terry | 346—30 |
| 3,006,712 | 10/61 | Eichacker | 346—14 |
| 3,116,875 | 1/64 | Wolfenden et al. | 235—117 |

FOREIGN PATENTS 62,194　10/12　Switzerland.

LEO SMILOW, *Primary Examiner*.